Jan. 30, 1940.   K. J. BRUNOV   2,188,621
STATION INDICATING DEVICE
Filed Sept. 30, 1937
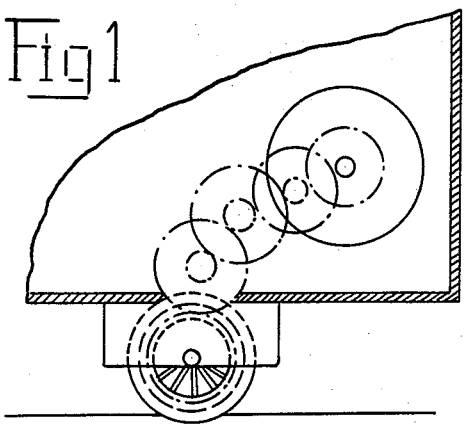
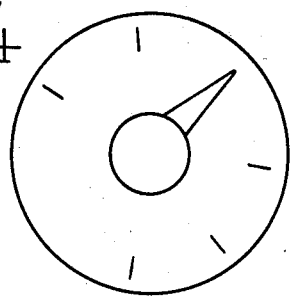
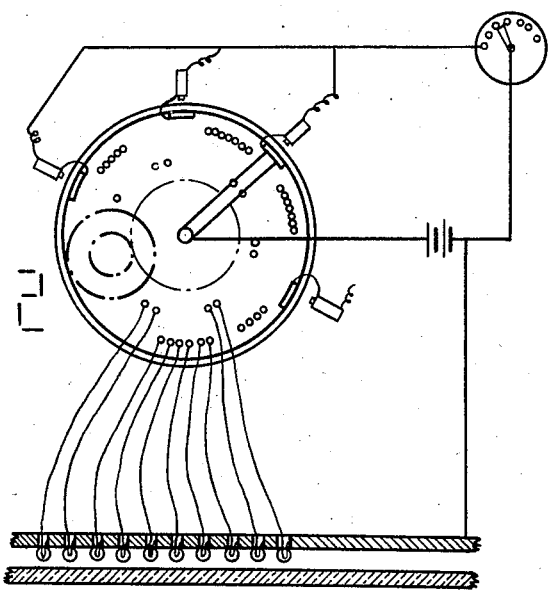
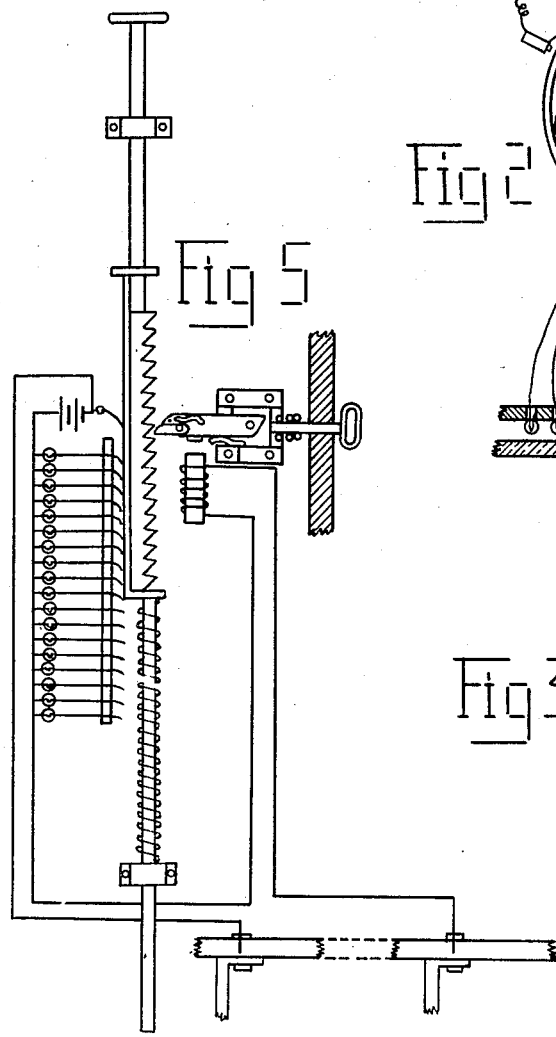
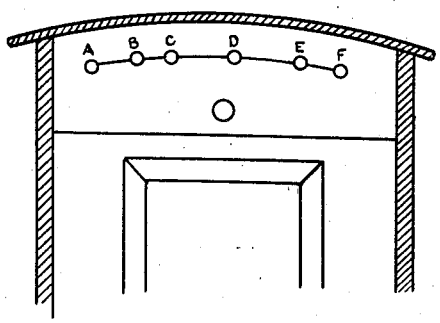
INVENTOR
KARL JOHAN BRUNOV
BY
*Richards & Geier*
ATTORNEYS Patented Jan. 30, 1940

2,188,621

UNITED STATES PATENT OFFICE 2,188,621

STATION INDICATING DEVICE

Karl Johan Brunov, Copenhagen, Denmark

Application September 30, 1937, Serial No. 166,551
In Denmark September 3, 1937

6 Claims. (Cl. 40—41)

The present invention relates to improvements in indicating devices and the like and it is particularly adapted for employment in vehicles travelling along a fixed route. One of the principal objects of the invention is to provide an indicator or signaling device controlled by the motion of the vehicle for indicating on a route chart within the vehicle the progress and position thereof along the line.

This general object is carried out by moving a contact arm or circuit closer either by mechanical or electro-magnetic force, to engage successively a series of contacts corresponding to stations along the route. This operation results in a row of lamps, or other indicating means, being actuated as the vehicle proceeds.

Some times, however, the circuit closer might get out of register with respect to the station contacts through mechanical defects or distortion or certain irregularities encountered during the course of progress. Unless such irregularity is corrected immediately, the discrepancy will increase progressively as the circuit closer moves along its path.

It is, therefore, a particular object of this invention to provide means for correcting such irregularities at predetermined intervals, preferably at each station contact. This object might be accomplished by using the circuit closer or contact arm as an armature for a group of solenoids positioned along the path of the circuit closer, preferably at or opposite each station contact.

The aforementioned objects and other advantages inherent in the invention will become more apparent as the specification proceeds and when taken in connection with the accompanying drawing showing a preferred embodiment of the invention and in which—

Fig. 1 is a fragmentary view in section through the lower portion of a railway car showing the position of some details of the invention, Fig. 2 is a diagrammatic view of the circuit hook-up according to the invention, Fig. 3 a fragmentary view of the upper portion of the railway car in cross section, showing an exterior view of the indicating sign, and Figure 4 is a view of the face of the casing enclosing the circuit closer having a rotatable pointer arm for adjusting the circuit closer manually with respect to a station contact.

Fig. 5 is a modification of the invention.

Referring to Fig. 1 the body 1 of the railway car is provided with two wheels, one of which only is shown. This wheel has on its inner side fixed toothed wheels 3 which through intermediate toothed wheels 4 and 5 engage another toothed wheel 6, disposed within a casing 7 and meshing with a toothed wheel 8 rigidly attached to a shaft 9 which extends through the casing and is rotatable in bearings (not shown) arranged within the vehicle. The casing 7 is preferably cylindrical in form and in Fig. 2 is shown with one end wall removed. Inside the casing and fixed to the shaft 9 is a contact arm 10, which revolves with the shaft within the casing. The gear ratio of the toothed wheels 3, 4, 5, 6, which hereinafter will be designated as the reducing gearing, is such that the shaft with the contact arm is revolved at such speed that the end of the contact arm travels a distance within the casing that corresponds to the distance the vehicle travels between two terminals, indicated by A and F in Fig. 2.

In the casing 7 there are a number of contact buttons. In the construction shown these buttons are arranged in two rows, the buttons in the outer row being indicated by 11a, and in the inner row alternately by 11b and 11c. The contact arm 10 is arranged to contact these buttons, one at a time, during its movement between A and F.

At any suitable place within the vehicle, for instance above a door, there is placed a metal plate or sign board 12 provided with sockets for a number of electric bulbs 13, 14 and 15. These bulbs may be differently coloured, for instance the bulbs 13 yellow, 14 red and 15 green. One terminal of each bulb or lamp is conductively connected with the plate 12, while the other terminal is connected to one of the contact buttons by means of the lead wires 25, for instance the terminal of a yellow lamp to a contact button 11a, of a red lamp to a contact button 11b and of a green lamp to a contact button 11c. In Fig. 2 only a few of these connections are shown for the sake of clearness. In front of the plate 12 there is arranged a translucent screen 16, on the outer surface of which is illustrated a diagram of the route 17 with stations 18, see Fig. 3.

The lamps are so positioned in the plate 12 in relation to the route 17 and stations 18 that a lamp for instance a red lamp 14, is placed immediately behind each station 18, a green lamp behind the portion of the route indicating the entrance to a station, and a number of yellow lamps 13 evenly distributed behind the route between the stations. The contact buttons 11a, 11b and 11c are so positioned and spaced within the casing as to correspond with the route and the spacing of the stations thereon.

The current for the lamps may be supplied from a battery 19 by means of a wire 20 leading from one terminal to the contact arm 10, and by means of wire 26 leading from the other terminal of the battery to the metal plate 12.

When the vehicle stands at station A, the contact arm engages the button 11b corresponding to this station, and which is connected to a red lamp. As the vehicle starts its travel from A in the direction of F, the contact arm is simultaneously rotated by means of the shaft and the reducing gearing described above. During the travel the contact arm 10 passes successively the contact buttons 11a, thereby lighting the corresponding yellow lamps 13, which thus show a yellow illuminated spot on the route 17. When the contact arm approaches the station B it contacts button 11c and the circuit is closed through the green lamp 15 connected thereto, thus indicating the approach of the station B. From here the contact arm proceeds to the next contact button 11b to light a red lamp that indicates the station B. The operation is repeated from station to station.

In case of inaccuracies in the adjustment of the contact arm in relation to the position of the vehicle on the route, there are provided means for automatically readjusting its position. Opposite each contact button 11b there is disposed an electromagnet 21, the coil of which is connected to a contact strip 22 which the contact arm engages when in the vicinity of the corresponding station. The coil of the electromagnet 21 is likewise connected to a contact member 23 of a switch 24, which in turn is connected to one of the terminals of the battery 19. The electromagnet 21 is energized by closing the circuit by means of the switch 24 engaging the contacts 23. The magnet 21 will then attract the arm 10 and hold it in a position corresponding to the respective station. In other words, the electromagnet may be adjusted when the train is at the station. In order to increase the attraction between the electromagnet 21 and the arm 10, the latter may be provided with a soft iron ring.

For adjusting the position of the arm 10 by mechanical means there may be arranged on the cover 7a of the casing 7 a number of marks 43, see Fig. 6, each corresponding to a contact button 11b. A handle or knob 44 is fixed to the end of the shaft 9 outside the cover 7a and carries a pointer 45. In case of irregularities in the position of the contact arm 10 in relation to the position of the vehicle on the route, the contact arm may be readjusted by turning the knob 44 until the pointer points at the mark 43 indicating the station in question.

In a modified manner of construction of the means for periodically altering the indication of the position of the vehicle on the route there may be arranged within the vehicle a device as illustrated in Fig. 7. This device comprises a rod 51 slidable in bearings 52 and 53 attached in any suitable manner to the vehicle. The rod 51 is provided with a ratchet having a number of teeth 54 and a stop collar or knob 55 at its upper end for limiting the downward stroke of the rod by abutting against the bearing 52. An expansion spring 57 is interposed between the column 56 of the ratchet and the shoulder 53 on the rod 51. This spring serves to hold the rod, together with the ratchet, in its uppermost position in the bearings. A collar 58 above the teeth serves to limit the upward stroke of the rod. On the rod behind the teeth 54 is attached a contact bar 59 opposite which there is disposed a number of contact springs 60 which are attached at one end to a bar 61 which is rigidly attached to the vehicle. The springs are so disposed that they slide along the contact bar 59 when the rod moves up or down. Each contact spring 60 is connected by means of a wire 62 to one terminal of a lamp 63 arranged at any convenient place within the vehicle, the other terminal of the lamp being connected to one terminal of a battery 64. The other terminal of the battery is connected to a bolt 65 in the floor 66 of the vehicle, which bolt serves to hold a spring 67 which will engage contacts arranged along the rails at intervals corresponding to the indications desired on the route chart.

Facing the teeth 54 on the rod 51 a pawl device is arranged. This pawl device consists of a plate 70 attached to a fixture within the vehicle. The plate has a dovetailed recess for a slide 71 on the outer surface of which is pivoted a lever 72 which extends towards the teeth 54 and carries on its free end a pawl 73, pivoted on a pin 74 in the lever 72. A stop pin 75 limits the upward turning of the pawl, which is held in abutment with this stop pin by means of a spring 76. The pawl engages the teeth 54. The lever 72 is held in engagement with a lug 77 on the slide 71 by means of a spring 78. The slide 71 carries a rod 79 projecting opposite to the pawl and carried through a partition 80 in the vehicle, and outside the partition the rod is provided with a handle 81. The spring 82 presses on the slide 71 to put the pawl 75 in engagement with teeth 54. Below the lever 71 there is arranged an electromagnet 83 coil of which is inserted between one terminal of the battery 64 and a bolt 84 in the floor of the vehicle, which bolt carries a spring 85 similar to and disposed a short distance from the above mentioned spring 67. When the contact springs 67 and 85 both contact with a contact along a rail as the train proceeds the circuit through the coil of the electromagnet 83 is closed, which thus attracts the lever 72 which for this purpose may be provided with an armature of soft iron. The downward movement of the lever in turn causes the pawl 73 to depress the rod 51, and by this depression the contact bar 59 on the rod is brought into contact with one of the contact springs 60, thereby closing a circuit through a contact spring 88 connecting the bar 59 with one terminal of the battery 64 and the lamp connected to the spring contact 60. When the vehicle during its continued progress again reaches a contact along the rail, the operation is repeated, and the contact bar 59 is moved to contact with the next contact spring 60 for lighting the corresponding lamp 63. The contact rails may be arranged just before or just after a station, and the lamps brought into operation will thus appear as a constantly lighted row of lamps indicating the distance on the route the vehicle at any moment has passed.

When the route is completed, the slide 71 is drawn outwardly by means of the handle 81, thus releasing the engagement of the pawl with the teeth 54, and the spring 57 will carry the rod to its uppermost position, from which the described operation begins again.

The above described devices may be employed in connection with any vehicle travelling along a fixed route, as for instance railway trains, particularly electric trains, tramways, commercial vehicles, etc., and the details of the invention may be altered in order to meet varying requirements without therefore deviating from the scope of the invention. Thus for instance means may be employed for operating from a single wheel of a vehicle a number of indicating signs disposed in the various compartments in the vehicle or in the vehicles of a train. Likewise the various modifications may be employed separately or in combination with each other.

I declare that what I claim is:

1. In an indicating device for vehicles travelling along a fixed route, a route chart, and uninterruptedly and continuously movable means controlled by the rotation of the wheels of the vehicle for indicating on said route chart the position of the vehicle, and electromagnetic means for adjusting said first-mentioned means to produce a signal in a predetermined position on said route chart and a switch for regulating said electromagnetic means.

2. In an indicating device for vehicles travelling along a fixed route, the combination with an electric circuit, a route chart, and uninterruptedly and continuously rotatable circuit closer controlled by the rotation of the wheels of the vehicle for producing a signal on said route chart at predetermined intervals to indicate the position of the vehicle.

3. In an indicating device for vehicles travelling along a fixed route, the combination with an electric circuit, a route chart, and an uninterruptedly and continuously rotatable circuit closer controlled by the rotation of the wheels of the vehicle for producing a signal on said route chart at predetermined intervals to indicate the position of the vehicle, and electro-magnetic means for adjusting said circuit closer to occupy a predetermined position for producing a signal on said chart and a switch for controlling said electro-magnetic means.

4. In an indicating device for vehicles travelling along a fixed route, the combination with an electric circuit, a route chart, a movable circuit closer made of magnetic material controlled by the motion of the vehicle for producing a signal on said route chart at predetermined intervals to indicate the position of the vehicle, a series of solenoids normally deenergized positioned at predetermined intervals along the path of said circuit closer for adjusting said circuit closer with respect to said predetermined positions, and a switch for energizing said solenoids.

5. In an indicating device for vehicles travelling along a fixed route, the combination with an electric circuit and a route chart; of a group of contacts in said circuit corresponding to predetermined positions along the route of the vehicle, a movable circuit closer of magnetic material controlled by the motion of the vehicle adapted to engage said contacts successively to produce signals on said route chart, a series of solenoids normally deenergized positioned at predetermined intervals along the path of said circuit closer for adjusting said circuit closer with respect to said predetermined position, and a switch for energizing said solenoids.

6. In an indicating device for vehicles travelling along a fixed route, the combination with an electric circuit and a route chart; of a group of contacts in said circuit corresponding to predetermined positions along the route to be travelled by the vehicle, a continuously and uninterruptedly rotatable circuit closer of magnetic material controlled by the rotation of the wheels of the vehicle adapted to engage said contacts successively to produce signals on said route chart, a solenoid normally deenergized position diametrically opposite each of said contacts for adjusting said circuit closer with respect to said contacts and a switch for energizing said solenoid.

KARL JOHAN BRUNOV.